US012686183B2

(12) United States Patent 
Witzgall et al.

(10) Patent No.: US 12,686,183 B2 
(45) Date of Patent: Jul. 21, 2026

(54) COMPONENT, METHOD FOR PRODUCING A COMPONENT, AND ASSEMBLY

(71) Applicant: ElringKlinger AG, Dettingen (DE)

(72) Inventors: Robert Witzgall, Reutlingen (DE); Harri Dittmar, Grünenbach (DE)

(73) Assignee: ElringKlinger AG, Dettingen (DE)

( * ) Notice: Subject to any disclaimer, the term of this patent is extended or adjusted under 35 U.S.C. 154(b) by 204 days.

(21) Appl. No.: 18/502,586

(22) Filed: Nov. 6, 2023

(65) Prior Publication Data

US 2024/0066811 A1 Feb. 29, 2024

Related U.S. Application Data

(63) Continuation of application No. PCT/EP2022/062210, filed on May 5, 2022.

(30) Foreign Application Priority Data

May 12, 2021 (DE) ..................... 10 2021 204 827.7

(51) Int. Cl.
*B29C 70/16* (2006.01)
*B29L 31/30* (2006.01)
(Continued)

(52) U.S. Cl.
CPC ................ *B29C 70/16* (2013.01); *B32B 3/30* (2013.01); *C08J 5/043* (2013.01); *H01M 50/00* (2021.01);
(Continued)

(58) Field of Classification Search
CPC ... B32B 3/30; B32B 2605/08; B32B 2250/40; B32B 2305/08; H01M 50/249;
(Continued)

(56) References Cited

U.S. PATENT DOCUMENTS 5,609,940 A * 3/1997 Inaba ...................... C08L 71/12
428/172
5,725,940 A * 3/1998 Sakai .................... B29C 70/865
428/318.6
(Continued)

FOREIGN PATENT DOCUMENTS

CA        2136773 A1    5/1995
DE        44 42 014 A1   6/1995
(Continued)

OTHER PUBLICATIONS

Translation of EP0865357B1. (Year: 2002).*

*Primary Examiner* — Catherine A. Simone 
(74) *Attorney, Agent, or Firm* — ASLAN LAW, P.C.

(57) ABSTRACT

The aim of the invention is to provide a particularly planar component that is as simple as possible to produce and has an optimized stability. In order to achieve said aim, a component is proposed which comprises or is formed from a polymer matrix material and at least one non-compressible filler, wherein an average proportion of the at least one non-compressible filler is preferably approximately 75 wt. % or more, based on the total mass of the component and/or based on a local mass of the component in a locally compacted region of the component, wherein the component has one or more attachment regions for attaching the component to an additional component, and wherein a material of the component is compressed at least in the one or more attachment regions.

22 Claims, 6 Drawing Sheets

(51) Int. Cl.

| | |
|---|---|
| *B32B 3/30* | (2006.01) |
| *C08J 5/04* | (2006.01) |
| *H01M 50/00* | (2021.01) |
| *H01M 50/229* | (2021.01) |
| *H01M 50/242* | (2021.01) |
| *H01M 50/249* | (2021.01) |

(52) U.S. Cl.
CPC ....... *H01M 50/229* (2021.01); *H01M 50/242* (2021.01); *H01M 50/249* (2021.01); *B29L 2031/3005* (2013.01); *B32B 2250/40* (2013.01); *B32B 2605/08* (2013.01); *H01M 2220/20* (2013.01)

(58) Field of Classification Search
CPC .. H01M 50/242; H01M 50/229; H01M 50/00; H01M 2220/20; B29L 2031/3005; Y10T 428/249946; C08J 5/043
See application file for complete search history.

(56) References Cited

U.S. PATENT DOCUMENTS

| | | |
|---|---|---|
| 2009/0115097 A1 | 5/2009 | de Groot |
| 2012/0315429 A1 | 12/2012 | Stamp et al. |
| 2012/0325393 A1 | 12/2012 | Denesi |
| 2013/0278020 A1 | 10/2013 | Preisler et al. |

FOREIGN PATENT DOCUMENTS

| | | | | |
|---|---|---|---|---|
| DE | 697 16 026 T2 | 5/2003 | | |
| DE | 698 11 024 T2 | 11/2003 | | |
| DE | 10 2010 004 028 A1 | 7/2011 | | |
| DE | 10 2014 203 761 A1 | 9/2015 | | |
| EP | 0865357 B1 * | 10/2002 | .......... | B29D 24/005 |
| WO | WO 98/51473 A1 | 11/1998 | | |

* cited by examiner

COMPONENT, METHOD FOR PRODUCING A COMPONENT, AND ASSEMBLY

RELATED APPLICATION

This application is a continuation of international application No. PCT/EP2022/062210 filed on May 5, 2022, and claims the benefit of German application No. 10 2021 204 827.7 filed on May 12, 2021, which are incorporated herein by reference in their entirety and for all purposes.

FIELD OF DISCLOSURE

The present invention relates to a component, in particular a planar component, for example, a cover element or a cladding element. The component is, for example, an underbody for a vehicle, in particular an electric vehicle.

The present invention also relates to a method for producing a component, in particular for producing a component according to the invention.

Furthermore, the present invention relates to an assembly which comprises a component according to the invention.

BACKGROUND

A flat material is known from DE 10 2019 219 594.6, which comprises a thermoplastic polymer matrix material in which a fiber material is received.

SUMMARY OF THE INVENTION

The present invention is based on the object of providing a component that is as simple to produce as possible and that has an optimized stability.

This object is achieved according to the invention by a component according to claim 1.

The component preferably comprises a polymer matrix material and at least one non-compressible filler.

An average proportion of the at least one non-compressible filler is preferably approximately 75 wt. % or more, based on a total mass of the component and/or based on a local mass of the component in a locally compressed region of the component.

The average proportion of the at least one non-compressible filler is preferably approximately 80 wt. % or more, based on the total mass of the component and/or based on a local mass of the component in a locally compressed region of the component.

In particular, the average proportion of the at least one non-compressible filler is approximately 97 wt. % or less, based on a total mass of the component and/or based on a local mass of the component in a locally compressed region of the component.

The component preferably has one or more attachment regions for attaching the component to an additional component. A material of the component is preferably compressed in the one or more attachment regions.

"Non-compressible" means, within the context of the present description and the accompanying claims, that the filler specified thereby is substantially incompressible and/or, under the effect of pressure, substantially does not change its volume at a constant temperature.

For example, a compression modulus of the at least one filler is approximately $3.0 \cdot 10^{10}$ Pa or more and/or approximately $6.5 \cdot 10^{10}$ Pa or less. The compression modulus is in particular defined by the spontaneous elastic change of the volume (and thus the density) as a result of a pressure or mechanical stress.

Additionally or alternatively, the average proportion of the at least one non-compressible filler is approximately 55 vol. % or more, in particular approximately 60 vol. % or more, based on a total volume of the component and/or based on a local volume of the component in a locally compressed region of the component.

In particular, the average proportion of the at least one non-compressible filler is approximately 97 vol. % or less, based on the total volume of the component and/or based on a local volume of the component in a locally compressed region of the component.

In the region of the one or more attachment regions, the component is preferably connected to the additional component.

In the region of the one or more attachment regions, the material of the component is compressed, for example pressed, locally and/or at points.

Due to the local and/or punctiform compression of the material of the component in the one or more attachment regions, a creeping of the material can in particular be reduced and/or minimized. This is advantageous in particular in the case of a connection, for example, with a metallic additional component.

It can be favorable if the material of the component is compressed and/or has an increased density in the region of the one or more attachment regions compared to the material of the component in the other region(s). The one or more other regions preferably form non-compressed regions.

Preferably, the one or more attachment regions are regions compressed during the production of the component. In particular, the one or more attachment regions are pressed regions.

According to an alternative embodiment, it can be provided that the entire material of the component is compressed compared to conventionally used filler-reinforced materials.

The proportion of the at least one non-compressible filler in the one or more attachment regions is preferably locally increased, for example, by approximately 5 wt. % or more, compared to the proportion of the at least one non-compressible filler in the material of the component in the other regions which do not form attachment regions.

"Compressed" means, within the context of the present description and the accompanying claims, that in a region of a material described as compressed, the proportion of the at least one non-compressible filler is approximately 80 wt. % or more, for example, approximately 85 wt. % or more, based on the total mass of the corresponding region.

In the context of the present description and the accompanying claims, "approximately" is preferably to be understood as a deviation of a value designated therewith of ±10%.

It can be advantageous if an average thickness of the component in the one or more attachment regions is approximately 10% or more lower than an average thickness of the component in the other regions.

The thickness of the component is preferably defined at least approximately perpendicularly to a main extension plane of the component.

It can be provided that the material of the component is pressed at least in the one or more attachment regions, in particular by using one or more compression elements, for example, one or more washers.

Preferably, the one or more compression elements are inserted into a tool. During the production of the component, the one or more compression elements are preferably pressed into and/or pushed into the component.

It can be advantageous if at least one of the at least one non-compressible fillers is a fiber material. For example, all non-compressible fillers used are fiber materials. In particular, a glass fiber material and/or a continuous fiber material is used as a non-compressible filler.

A "continuous fiber material" is preferably a fiber material in which 90% or more, in particular 95% or more, of the fibers have a length of approximately 40 mm or more, preferably approximately 50 mm or more.

Approximately 80% of the fibers of the fiber material or more, in particular approximately 90% of the fibers of the fiber material or more, are preferably arranged at least approximately parallel to one another and/or parallel to a main extension plane of the component.

An orientation of the fibers is preferably determined by means of electron microscopy and in particular by means of subsequent image processing.

Preferably, the at least one non-compressible filler is a unidirectional fiber material, for example, a unidirectional glass fiber material.

In particular for optimized component properties, it can be advantageous if the material of the component has a creep resistance $c_c$ of approximately 0.75 or more, in particular of approximately 0.85 or more, at least in the one or more attachment regions.

The creep behavior of the material of the component is preferably determined according to DIN EN ISO 899.

The creep behavior of a material, in the present case of the material of the component, is typically determined by the creep modulus. The creep modulus $E_c$ is defined for time-dependent loads as a ratio between stress and a time-dependent deformation that occurs:

$$E_c = \frac{\sigma}{\varepsilon_{ges}(t)}$$

Here, $\sigma$ (Sigma) denotes the mechanical stress (normal stress, non-shear stress) and $\varepsilon$ (Epsilon) denotes elongation. The elongation is the ratio of a change in length to the original length.

The unit of the creep modulus is the unit of a stress, often indicated in Pascal (Pa).

By determining the creep modulus, the temporal influence in the modulus of elasticity can be determined in polymer materials.

For example, the component is a large-area component and/or a flat component.

Preferably, the component is a housing component for an electrochemical system, for example, a battery floor and/or an underride protection element of an electric vehicle.

Electrochemical systems are, for example, battery modules.

Particularly preferably, the component is used for an electrochemical system of an electric vehicle.

It can be favorable if the one or more attachment regions each have an at least approximately hollow-cylindrical opening in the component that extends through the component in particular in a direction running at least approximately perpendicularly to a main extension plane of the component.

The use of sleeves, for example metallic sleeves, for attaching the component to an additional component, is in particular unnecessary.

It can be advantageous if the polymer matrix material comprises a thermoplastic polymer material, for example polypropylene, or is formed therefrom.

By compressing the material in the one or more attachment regions, a creep resistance of the component is preferably designed in the one or more attachment regions.

It can be advantageous if the proportion of the at least one non-compressible filler at least in the one or more attachment regions is approximately 65 vol. % or more, for example approximately 70 vol. % or more, based on a total volume of the corresponding attachment region.

Thus, in particular when the component is screwed to an additional, for example metallic, component, a tightening torque which corresponds approximately to 70% or more of an original tightening torque which is present directly after and/or during screwing can be achieved during warm storage over 120 hours.

Preferably, the component has approximately 30 attachment regions or more, in particular approximately 40 attachment regions or more, for example approximately 50 attachment regions or more.

Due to the fact that metallic sleeves are unnecessary when the component is attached to an additional component, an assembly comprising the component can preferably be produced with reduced weight. In particular, component costs can be saved in the assembly.

For example, the one or more attachment regions are regions in which a force is introduced and/or on which a force acts when the component is attached to an additional component, for example by screwing.

It can be advantageous if approximately 20 vol. % of the component or less, in particular approximately 10 vol. % of the component or less, for example approximately 5 vol. % of the component or less, based on a total volume of the component, is compressed.

In the one or more compressed regions and/or the one or more attachment regions, the material of the component preferably has a density which is approximately 5% or more greater than a density in the non-compressed region(s).

For example, a proportion of the one or more attachment regions is approximately 20 vol. % of the component or less, in particular approximately 10 vol. % of the component or less, preferably approximately 5 vol. % of the component or less, based on the total volume of the component.

The proportion of the one or more attachment regions is preferably approximately 5% or less, in particular approximately 2% or less, based on a total area of the component.

The present invention further relates to a method for producing a component, for example for producing a component according to the invention.

In this respect, the object of the invention is to provide a method by means of which a component having an increased stability can be produced as simply as possible.

According to the invention, this object is achieved by a method according to the independent method claim.

Preferably, a component is provided which comprises or is formed from a polymer matrix material and at least one non-compressible filler. An average proportion of the at least one non-compressible filler is preferably approximately 75 wt. % or more, in particular approximately 80 wt. % or more, based on the total mass of the component and/or based on a local mass of the component in a locally compressed region of the component.

Preferably, a material of the component is compressed in one or more attachment regions, for example, by pressing.

The method according to the invention preferably has one or more of the features cited in connection with the component according to the invention and/or one or more of the advantages cited in connection with the component according to the invention.

It can be advantageous if the component has a continuous opening in one or more attachment regions, in particular in each attachment region, which opening serves, for example, as a channel for a screw in the case of a screw connection.

A compressed region preferably surrounds the opening in a ring shape, in particular in a circular ring shape.

Preferably, an outer diameter of the compressed region which surrounds an opening is at least approximately twice, preferably at least approximately three times, the diameter of the opening.

As an alternative or in addition thereto, it can be provided that an outer diameter of the compressed region which surrounds an opening, in particular this opening, is at most approximately ten times, preferably at most approximately five times, the diameter of the opening.

Preferably, a compression element, for example, a washer, is positioned against and/or on the component in each attachment region before and/or while the corresponding compression element is pressed against the component by a tool, whereby the component is compressed in the corresponding attachment region.

Alternatively, it can be provided that one or more compression elements are positioned in the tool and only brought into contact with the component during a pressing process and/or press-in process.

It can be favorable if the one or more compression elements are selected such that their outer diameter is approximately 85% or more and/or approximately 90% or less of a desired outer diameter of an attachment region of the component which results in each case through compression.

A washer is preferably used as a compression element. Washers having an outer diameter of approximately 20 mm or more and/or 24 mm or less have proven to be particularly preferred.

For example, an attachment region with an outer diameter of approximately 25 mm can be formed with washers which have an outer diameter of approximately 22 mm. Thus, typical tolerances can be compensated.

The present invention also relates to an assembly.

The object of the invention in this regard is to provide an assembly which can be assembled as simply as possible.

This object is achieved according to the invention by an assembly according to the independent claim directed to an assembly.

The assembly comprises a component according to the invention and an additional component. The component and the additional component are connected to one another in one or more attachment regions of the component, for example, by screwing.

The assembly according to the invention preferably has one or more of the features cited in connection with the component according to the invention, and/or one or more of the advantages cited in connection with the component according to the invention.

It can be provided that the assembly has a plurality of components and/or a plurality of additional components.

A metallic support element is preferably suitable as an additional component.

It can be advantageous if the component and the additional component are connected to one another directly, in particular sleeve-free and/or without a sleeve, in the one or more attachment regions. Costs can thus be saved and the production of the assembly can be simplified.

It can be favorable if the component and the additional component are connected to one another in the one or more attachment regions by screwing and if 60% or more of an original tightening torque, which is present during screwing, remains in the one or more attachment regions during warm storage, for example, over 120 hours or more.

The warm storage is carried out, for example, at approximately 80° C.

It can be advantageous if the additional component is a metallic support element, wherein the component and the additional component are connected to one another by screwing in the one or more attachment regions of the component. Preferably, a loosening torque in the one or more attachment regions for loosening the corresponding screw connection is approximately 70% or more of a tightening torque in the corresponding attachment region.

The present invention also preferably relates to a sandwich component.

The sandwich component preferably comprises two cover layers and a core arranged between the cover layers. One or both cover layers are in particular tape cover layers. The core is formed, in particular, from a mass which is flowable at least during production of the core, for example, from GMT material (glass mat thermoplastic) or DLFT material (direct long fiber thermoplastic), or comprises such a material.

Preferably, one or more attachment regions of the sandwich component are formed preferably by local displacement of the core and/or by local compacting of one or both cover layers.

A displacement process takes place in particular in a state of the core in which it is deformable, in particular flowable, for example, immediately after introducing a material for producing the core between the cover layers.

It can be favorable if one or both cover layers and/or the core comprise or can be produced from a component having one or more features of the aforementioned component and/or of the aforementioned starting component.

The sandwich component preferably comprises one or more compacted regions which in particular form attachment regions. The sandwich component preferably has a reduced material thickness in the corresponding attachment region, wherein in particular a material thickness of the core in the attachment region is reduced compared to the material thickness of the core in an area surrounding the attachment region.

The material thickness of the core is thereby preferably reduced by at least approximately 70%, preferably by at least approximately 90%. The core is preferably completely displaced in the attachment region, so that the cover layers lie substantially directly against one another.

The reduction in the material thickness of the sandwich component in the attachment region is preferably obtainable by the sandwich component in particular being locally pressed during its production. The core is thereby displaced from the intermediate space between the cover layers, in particular until the cover layers lie directly against one another.

Preferably, further pressing also takes place in such a way that one or both cover layers themselves are compacted, in particular compressed. The cover layers are in particular starting components which are solidified for the optimized attachment of fastening elements.

The further pressing can be achieved, for example, by means of a punch of a tool in order to generate locally increased pressing forces.

It can be favorable if the cover layers and/or the attachment region of the sandwich component together with an area surrounding them are deformed, for example, molded in a direction out of a main extension plane of the sandwich component. The attachment regions thus form fastening points protruding from the main extension plane, for example, fastening domes.

A particularly stable attachment region can preferably be produced by the displacement of the core and/or by the compacting of one or both cover layers. In particular, an additional sleeve for screwing the sandwich component to an additional component is thereby preferably unnecessary.

The attachment regions are preferably arranged and/or designed in a pattern, symmetrically, regularly and/or uniformly distributed on the component, in particular the sandwich component.

The following description and the drawings of embodiments relate to further features and/or advantages of the invention.

Identical or functionally equivalent elements are labeled with the same reference signs in all figures.

DETAILED DESCRIPTION OF THE DRAWINGS

Figure 1:
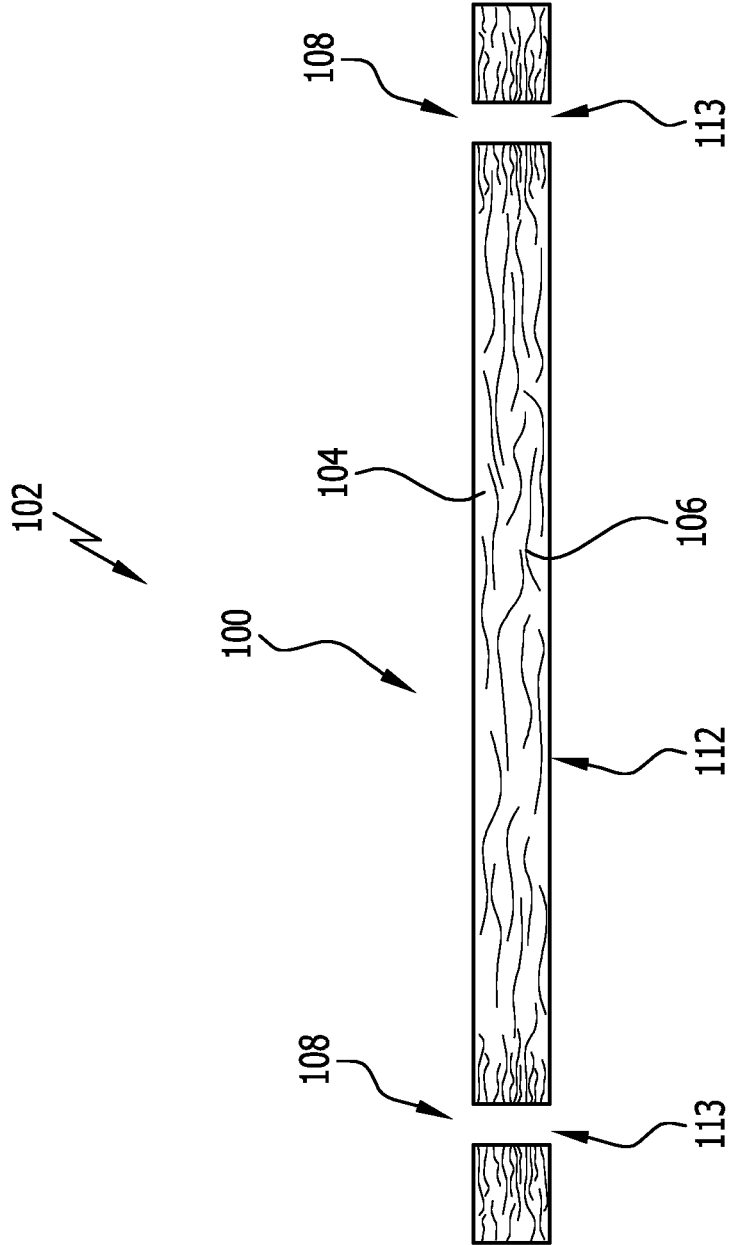
FIG. 1 shows a schematic sectional view of an embodiment of a component, wherein the component has a plurality of attachment regions, in the region of which a material of the component is compressed, for example, compared to the remaining non-compressed regions.

A component shown in FIG. 1 and denoted as a whole by 100 is suitable in particular for use as a cover element or protective element, for example in combination with an electrochemical system 102, for example, a battery module, which is not shown in its entirety in the drawings. The electrochemical system 102, for example, the battery module, is preferably used in an electric vehicle.

The component 100 is in particular a planar component 100 which, along its two main extension directions, has an expanse that is at least 10 times, in particular at least 100 times, greater than in a thickness direction of the component 100.

The component 100 is preferably plate-shaped.

Preferably, the component 100 has a width of approximately 1.50 m or more, in particular of approximately 1.75 m or more.

In particular, the width of the component 100 is approximately 2.5 m or less, for example, approximately 2.15 m or less.

A length of the component 100 arranged perpendicularly to the width of the component 100 is preferably approximately 1 m or more, in particular 1.25 m or more.

In particular, the length of the component 100 is approximately 4.0 m or less, for example, approximately 3 m or less.

For example, the component 100 is designed with dimensions of approximately 2.0 m times 1.5 m (2.0 m×1.5 m).

For example, the component 100 is a battery floor or an underride protection, for example, an underbody cladding of a vehicle, in particular an electric vehicle. In embodiments in which the electrochemical system 102 is used in an electric vehicle, the component 100 serves preferably as an underride protection element for protecting a battery device arranged in the floor region.

It can be advantageous if the component 100 is formed from a polymer matrix material 104 and at least one non-compressible filler 106.

Alternatively, it can be provided that the component 100 comprises the polymer matrix material 104 and the at least one non-compressible filler 106 and contains additional constituents, for example, one or more additives.

Preferably, the polymer matrix material 104 comprises or is formed from a thermoplastic polymer material. Polypropylene is a preferred thermoplastic polymer material.

Additionally or alternatively, additional thermoplastic polymer materials can also be used for the polymer matrix material 104, for example, one or more additional thermoplastic polyolefins.

A fiber material, for example, a glass fiber material, is preferably used as a non-compressible filler 106.

It can be advantageous if the fiber material is a continuous fiber material.

Continuous fiber materials can preferably be incorporated into a thermoplastic polymer matrix material.

A "continuous fiber material" is preferably a fiber material in which 90% or more, in particular 95% or more, of the fibers have a length of approximately 40 mm or more, preferably approximately 50 mm or more.

It can be favorable if fibers of the fiber material have a preferred direction which runs at least approximately parallel to a main extension plane of the component 100.

Approximately 80% of the fibers of the fiber material or more, in particular approximately 90% of the fibers of the fiber material or more, are preferably arranged at least approximately parallel to one another.

An orientation of the fibers is preferably determined by means of electron microscopy and in particular by means of subsequent image processing.

It can be advantageous if a continuous fiber material in the form of continuous glass fibers is used as a glass fiber material.

The continuous glass fibers are indicated schematically in FIG. 1.

It can be favorable if the at least one non-compressible filler 106, in the present case the continuous glass fibers, is received and/or embedded in the polymer matrix material 104.

An average proportion of the at least one non-compressible filler 106 is preferably 75 wt. % or more, in particular approximately 80 wt. % or more, based on a total mass of the component 100 and/or based on a local mass of the component 100 in a locally compressed region of the component 100.

The average proportion of the at least one non-compressible filler 106 is preferably approximately 97 wt. % or less, based on the total mass of the component 100 and/or based on a local mass of the component 100 in a locally compressed region of the component 100.

Additionally or alternatively, the average proportion of the at least one non-compressible filler 106 is preferably approximately 55 vol. % or more, in particular approximately 60 vol. % or more, based on a total volume of the component 100 and/or based on a local volume of the component 100 in a locally compressed region of the component 100.

The average proportion of the at least one non-compressible filler 106 is preferably approximately 97 vol. % or less, based on the total volume of the component 100 and/or based on a local volume of the component 100 in a locally compressed region of the component 100.

Preferably, the component 100 has one or more (in the present case a plurality of) attachment regions 108. The attachment regions 108 preferably serve to attach the component 100 to an additional component 110 (see FIG. 2).

In the attachment regions 108, a material of the component 100 is preferably compressed, in particular compared to one or more non-compressed regions 112. In the present case, the one or more non-compressed regions 112 form all regions of the component 100 which do not form the attachment regions 108.

The proportion of the at least one non-compressible filler in the attachment regions 108 is preferably approximately 80 wt. % or more, for example approximately 85 wt. % or more, based on the total mass of the corresponding attachment region 108.

It can be advantageous if an average thickness of the component 100 in the attachment regions 108 is approximately 10% or more less than an average thickness of the component 100 in the other regions.

The thickness of the component 100 is preferably defined at least approximately perpendicularly to a main extension plane of the component 100.

It can be favorable if approximately 20 vol. % or less of the component 100, in particular approximately 10 vol. % or less of the component 100, for example approximately 5 vol. % or less of the component 100, based on a total volume of the component 100, is compressed and/or are formed by the attachment regions 108. In the compressed regions and/or attachment regions 108, the material of the component 100 preferably has a density which is approximately 5% or more greater than a density in the non-compressed region(s).

Due to the increased proportion of the at least one non-compressible filler 106 in the attachment regions 108, a sleeveless and/or sleeve-free connection of the component 100 to the additional component 110 is preferably possible.

For example, the component 100 and the additional component 110 can be connected, for example screwed, directly to one another.

It can be advantageous if the component has an opening 113 in each attachment region 108, which opening serves, for example, as a channel for a screw in the case of a screw connection.

The one or more (in the present case the plurality of) openings 113 are preferably designed to be at least approximately hollow-cylindrical and/or extend from a first main side to a second main side of the component 100.

A main extension direction of the openings 113 preferably runs at least approximately perpendicularly to a main extension plane of the component 100.

Figure 2:
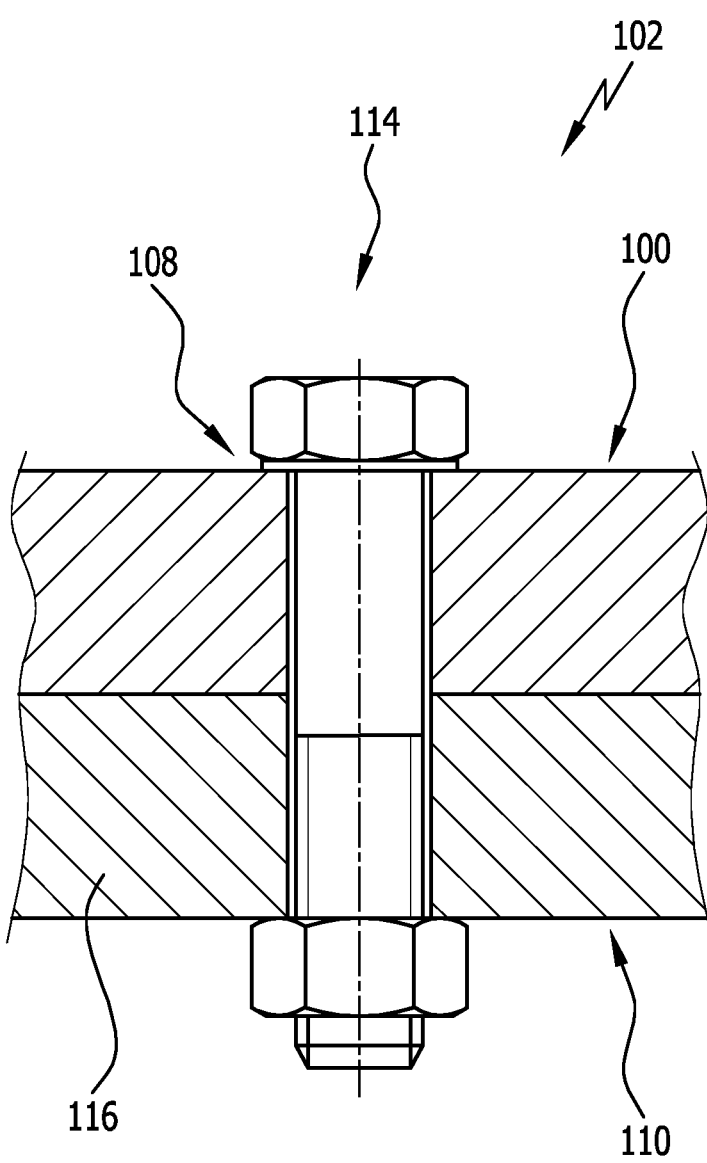
FIG. 2 shows a detail of a schematic sectional view of an assembly, which comprises a component according to FIG. 1 and an additional component, which are connected to one another without a sleeve by means of a screw connection in an attachment region of the component.

In a connected state shown in FIG. 2, the component 100 and the additional component 110 preferably form an assembly 114.

It can be provided that the assembly 114 comprises further components 100 and/or further additional components 110 (not shown in the drawing).

The additional component 110 is, for example, a metallic support element 116.

For example, the additional component 110 forms a part of a vehicle body.

It can be provided that the component 100 has approximately 50 attachment regions 108 in which it is attached to the additional component 110 and/or additional elements of a vehicle body.

In particular due to the comparatively high proportion of the at least one non-compressible filler 106, the connection of the component 100 and the additional component 110 shown in FIG. 2 can have one or more of the following properties:

a loosening torque of the connection is approximately 70% or more of a tightening torque, and/or a tightening torque after warm storage over 120 hours is approximately 60% of an original tightening torque which was to be applied during the screwing of the component 100 and the additional component.

The warm storage is preferably carried out at about 80° C.

It can be favorable if a material of the component 100 has a creep resistance $c_c$ of approximately 0.75 or more, in particular of approximately 0.85 or more, in the attachment regions 108.

For producing the component 100 (cf. flow chart in FIG. 3), a starting component 118 is preferably inserted into a tool 120.

The starting component 118 preferably comprises a polymer matrix material 104 and at least one non-compressible filler 106, for example, continuous glass fibers.

An average proportion of the at least one non-compressible filler 106 is preferably approximately 75 wt. % or more, in particular approximately 80 wt. % or more, based on the total mass of the starting component 118.

The average proportion of the at least one non-compressible filler 106 is preferably approximately 55 vol. % or more, in particular approximately 60 vol. % or more, based on a total volume of the starting component 118.

In this case, the at least one non-compressible filler 106 is in particular distributed homogeneously over the entire starting component 118.

It can be advantageous if one or more (in the present case a plurality of) compression elements 122 are inserted into the tool 120.

The tool 120 is, for example, a pressing tool.

In particular, the compression elements 122 are positioned in such a way that, when two tool parts of the tool 120 are closed, they lie against the starting component 118 at attachment regions 108 of the component and/or are in contact therewith.

Washers have proven to be particularly preferred compression elements 122.

It can be favorable if compression elements 122 are used, the outer diameter of which is approximately 85% or more and/or approximately 90% or less of an outer diameter of an attachment region 108, each resulting from compression, of the component 100.

For example, washers are used which have an outer diameter of approximately 10 mm or more, in particular of approximately 20 mm or more, and/or approximately 30 mm or less, in particular approximately 24 mm or less. Washers which have an outer diameter of approximately 22 mm are preferably used.

Figure 3:
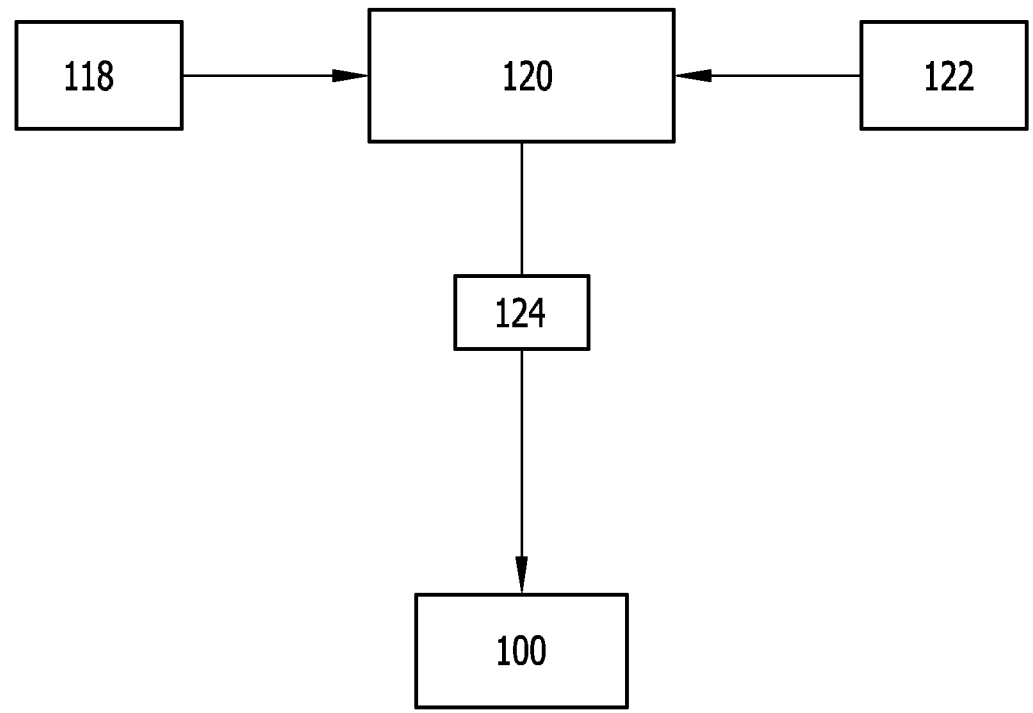
FIG. 3 shows a schematic representation of a method for producing the component from FIG. 1, wherein the material of the component is compressed in one or more of the attachment regions by a compression element in each case.

After positioning the compression elements 122, the tool 120 is preferably actuated, for example, by closing the tool parts. In particular, the starting component 118 is pressed, whereby the component 100 is produced. The pressing is indicated in FIG. 3 by the reference sign 124.

In embodiments in which washers are used which have an outer diameter of approximately 22 mm, the resulting attachment regions 108 of the component 100 preferably have an outer diameter of approximately 25 mm.

The method described above preferably results in a creep-resistant component 100.

A tendency of the component 100 to creep while being screwed into the and/or to an assembly 114 can preferably be minimized. A use of metallic sleeves during screwing to a metallic additional component 110 is preferably unnecessary.

Figure 4:
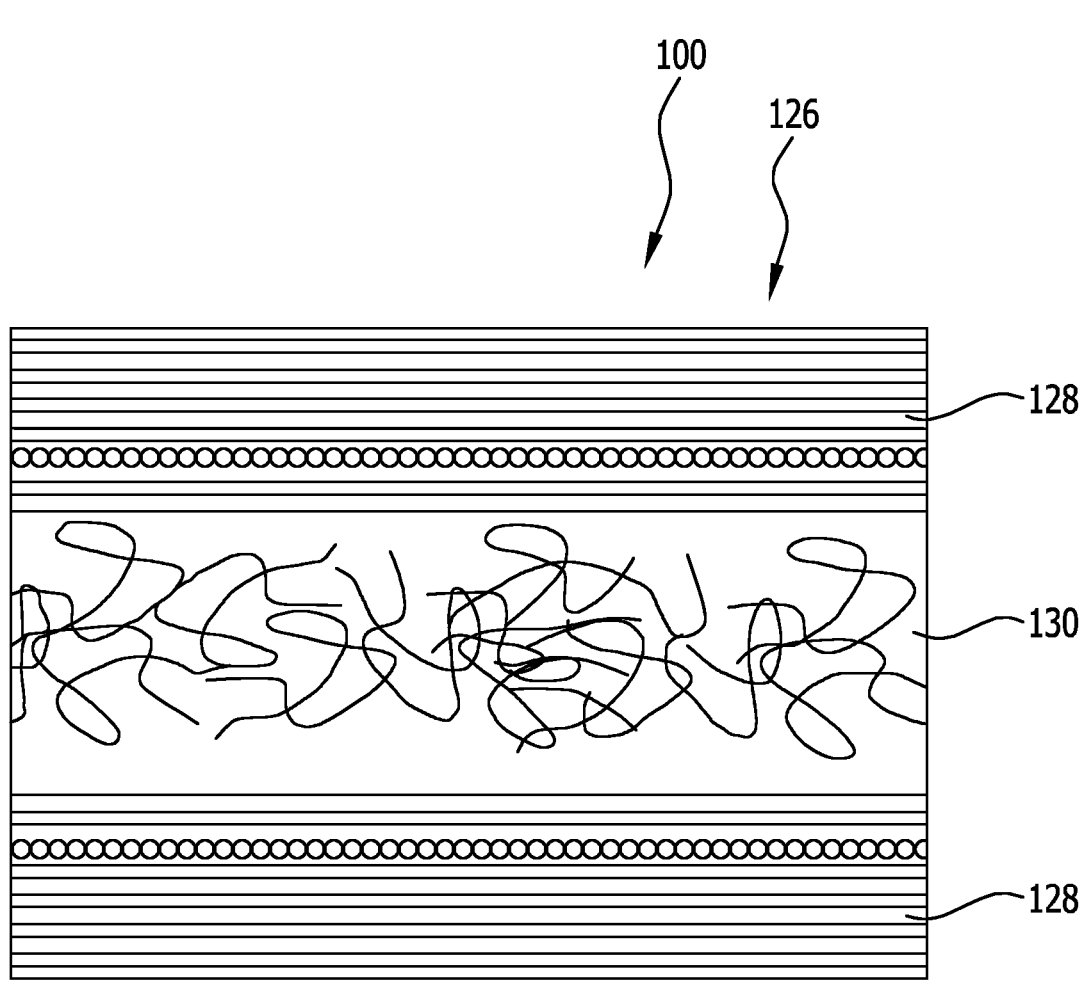
FIG. 4 shows a schematic section through a sandwich component.
Figure 5:
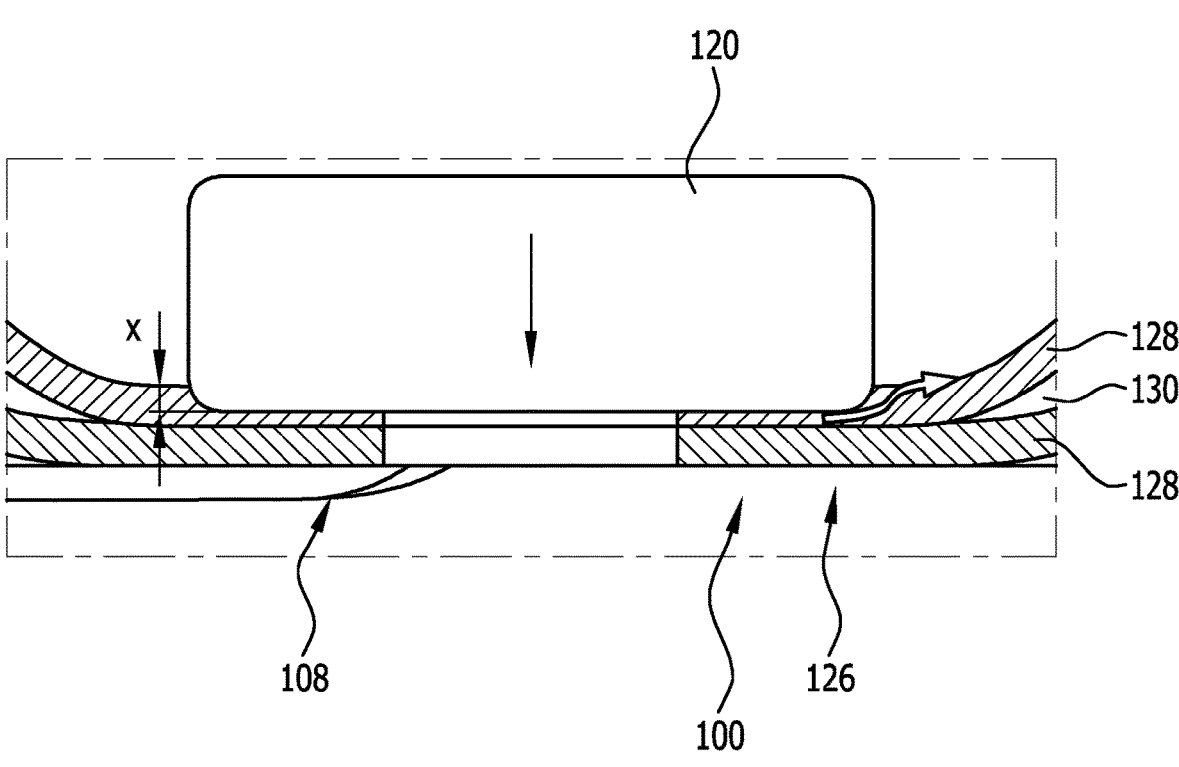
FIG. 5 shows a schematic section through a tool for producing the sandwich component.
Figure 6:
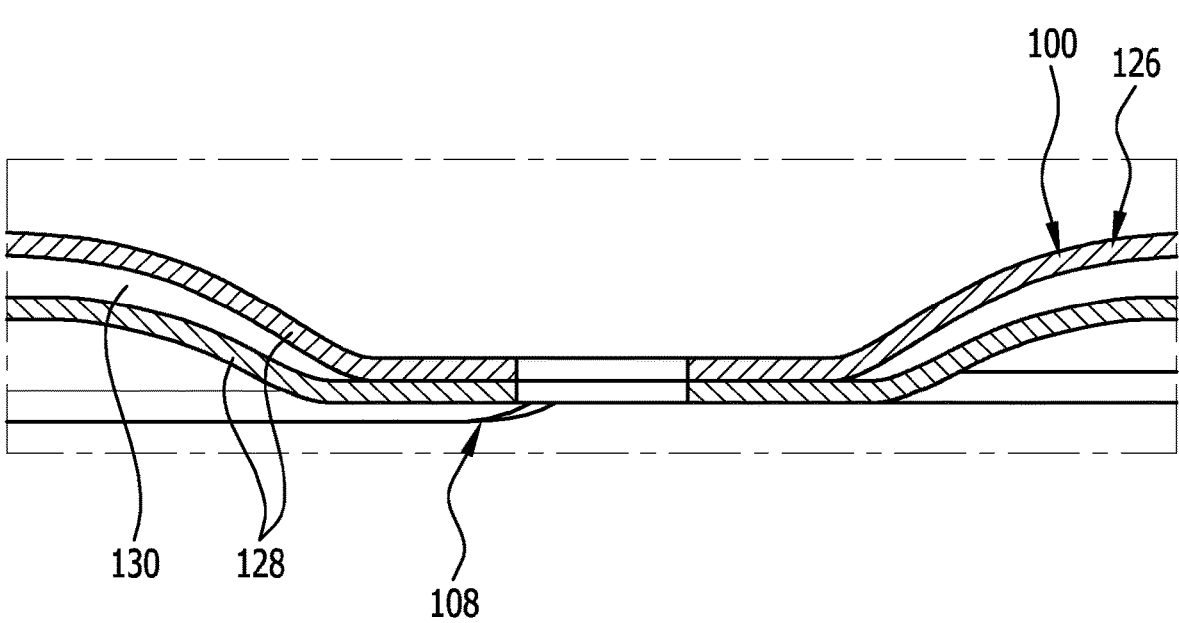
FIG. 6 shows a schematic section through an attachment region of a sandwich component produced by means of the tool.

As can be seen in particular from FIGS. 4 to 6, it can be advantageous if the component 100 is a constituent of a larger unit, for example, a sandwich component 126.

The sandwich component 126 preferably comprises two cover layers 128 and a core 130 of the sandwich component 126 arranged between the cover layers 128.

The sandwich component 126 preferably comprises one or two or more components 100, in particular according to one of the embodiments described above.

In particular, the sandwich component 126 is formed or can be produced from one or more starting components 118 according to one of the embodiments described above.

One or both cover layers 128 of the sandwich component 126 are preferably formed from one or more starting components 118 or can be produced therefrom.

Alternatively or additionally, it can be provided that the core 130 is formed from one or more starting components 118 or can be produced therefrom.

As can be seen in particular from FIGS. 5 and 6, the sandwich component 126 preferably comprises one or more compacted regions, which in particular form attachment regions 108. The sandwich component 126 has a reduced material thickness in the attachment region 108, wherein in particular a material thickness of the core 130 in the attachment region 108 is reduced compared to the material thickness of the core in an area surrounding the attachment region 108.

The material thickness of the core 130 is thereby preferably reduced by at least approximately 70%, preferably by at least approximately 90%. The core 130 is preferably completely displaced in the attachment region 108, so that the cover layers 128 lie substantially directly against one another.

As can be seen in particular from the representation of the tool 120 in FIG. 5, the reduction of the material thickness of the sandwich component 126 in the attachment region 108 can be achieved by pressing the sandwich component 126. The core 130 is thereby displaced from the intermediate space between the cover layers 128, in particular until the cover layers 128 lie directly against one another.

Preferably, further pressing takes place in such a way that the cover layers 128 themselves are compacted, in particular compressed. The cover layers 128 are in particular starting components 118 which are solidified for the optimized attachment of fastening elements.

At the same time or independently thereof, the cover layers 128 and/or the attachment region 108 of the sandwich component 126 together with the surroundings thereof are preferably deformed by means of the tool 120, for example molded in a direction out of a main extension plane of the sandwich component 126. The attachment regions 108 thus form fastening points protruding in particular from the main extension plane.

A particularly stable attachment region 108 can preferably be produced by the displacement of the core 130 and/or by the compacting of one or both cover layers 128. In particular, an additional sleeve for screwing the sandwich component 126 to an additional component 110 is thereby preferably unnecessary.

The invention claimed is:

1. A component wherein the component comprises or is formed from a component material which said component material comprises a polymer matrix material and at least one non-compressible filler, wherein an average proportion of the at least one non-compressible filler is approximately 75 wt. % or more, based on a total mass of the component and/or based on a local mass of the component in a locally compressed region of the component, wherein the component has one or more attachment regions for attaching the component to an additional component, wherein the component material is compressed at least in the one or more attachment regions, wherein the component material has a creep resistance $c_c$ of approximately 0.75 or more at least in the one or more attachment regions.

2. The component according to claim 1, wherein the component material is pressed at least in the one or more attachment regions by using one or more compression elements.

3. The component according to claim 1, wherein at least one of the at least one non-compressible fillers is a fiber material or a glass fiber material or continuous glass fibers.

4. The component according to claim 1, wherein the component material has a creep resistance $c_c$ of approximately 0.85 or more at least in the one or more attachment regions.

5. The component according to claim 1, wherein the component is a housing component and/or a battery floor and/or an underride protection element.

6. The component according to claim 1, wherein the one or more attachment regions each have an at least approximately hollow-cylindrical opening in the component
or
wherein the one or more attachment regions each have an at least approximately hollow-cylindrical opening in the component, which opening extends in a direction running at least approximately perpendicularly to a main extension plane of the component.

7. The component according to claim 1, wherein the polymer matrix material comprises or is formed from a thermoplastic polymer material and/or, polypropylene.

8. The component according to claims 1, wherein the proportion of the at least one non-compressible filler at least in the one or more attachment regions is approximately 65 vol. % or more based on a volume of the component in the one or more attachment regions.

9. The component according to claim 1, wherein approximately 10 vol. % of the component or less, based on a total volume of the component, is compressed.

10. A method for producing said component according to claim 1, wherein the method comprises the following:
providing a starting component material which comprises or is formed from the polymer matrix material and the at least one non-compressible filler, wherein an average proportion of the at least one non-compressible filler is approximately 75 wt. % or more, based on a total mass of the starting component material; and compressing the starting component material in one or more attachment regions.

11. The method according to claim 10, wherein, at least in each of the one or more attachment regions, a compression element or a washer, is positioned on the starting component material before the compression element or the washer is pressed against the starting component material by a tool, whereby the starting component material is compressed in or the washer attachment regions.

12. The method according to claim 10, wherein the starting component material or two starting components materials form one or both cover layers of a sandwich component, wherein a core arranged between the cover layers is locally displaced during production of the one or more attachment regions and/or wherein the one or more cover layers are compacted.

13. An assembly, wherein the assembly comprises said component according to claim 1 and an additional component, wherein the component and the additional component are connected to one another in one or more of the one or more attachment regions of the component or wherein the component and the additional component are connected to one another in one or more of the one or more attachment regions of the component by screwing.

14. The assembly according to claim 13, wherein the component and the additional component are connected to one another directly in the one or more attachment regions or wherein the component and the additional component are connected to one another directly without a sleeve in the one or more attachment regions.

15. The component according to claim 1. wherein the component is a sandwich component comprising two cover layers and a core arranged between the cover layers, wherein one or more attachment regions of the sandwich component are formed by locally displacing the core and/or by locally compacting one or both cover layers.

16. The sandwich component according to claim 15, wherein one or both cover layers and/or the core comprise a component or are produced or can be produced from a component or a planar component, wherein the component comprises or is formed from the component material comprising the polymer matrix material and the at least one non-compressible filler, wherein an average proportion of the at least one non-compressible filler is approximately 75 wt. % or more, based on a total mass of the component and/or based on a local mass of the component in a locally compressed region of the component, wherein the component has one or more attachment regions for attaching the component to an additional component, wherein the component material is compressed at least in the one or more attachment regions.

17. The component according to claim 1, wherein the proportion of the at least one non-compressible filler at least in the one or more attachment regions is 70 vol. % or more based on a volume of the component in the one or more attachment regions.

18. The component according to claim 1, wherein approximately 5 vol. % of the component or less, based on a total volume of the component, is compressed.

19. A component wherein the component comprises or is formed from a component material which component material comprises a polymer matrix material and at least one non-compressible filler, wherein an average proportion of the at least one non-compressible filler is approximately 75 wt. % or more, based on a total mass of the component and/or based on a local mass of the component in a locally compressed region of the component, wherein the component has one or more attachment regions for attaching the component to an additional component, wherein the component material is compressed at least in the one or more attachment regions, wherein approximately 10 vol. % of the component or less, based on a total volume of the component, is compressed.

20. The component according to claim 19, wherein the component material has a creep resistance $c_c$ of approximately 0.75 or more at least in the one or more attachment regions.

21. The component according to claim 19, wherein approximately 5 vol. % of the component or less, based on a total volume of the component, is compressed.

22. The component according to claim 19, wherein the component material has a creep resistance cc of approximately 0.85 or more at least in the one or more attachment regions.

* * * * *